P. FLAMAND.
HOUSING FOR UNIVERSAL JOINTS.
APPLICATION FILED OCT. 23, 1919.
1,361,573.
Patented Dec. 7, 1920.
2 SHEETS—SHEET 2.
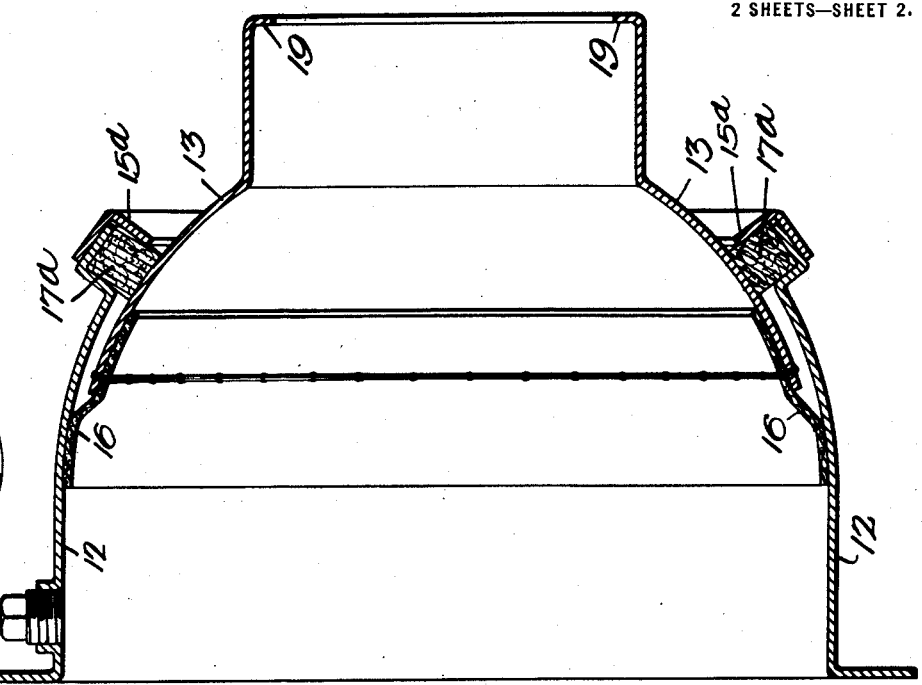
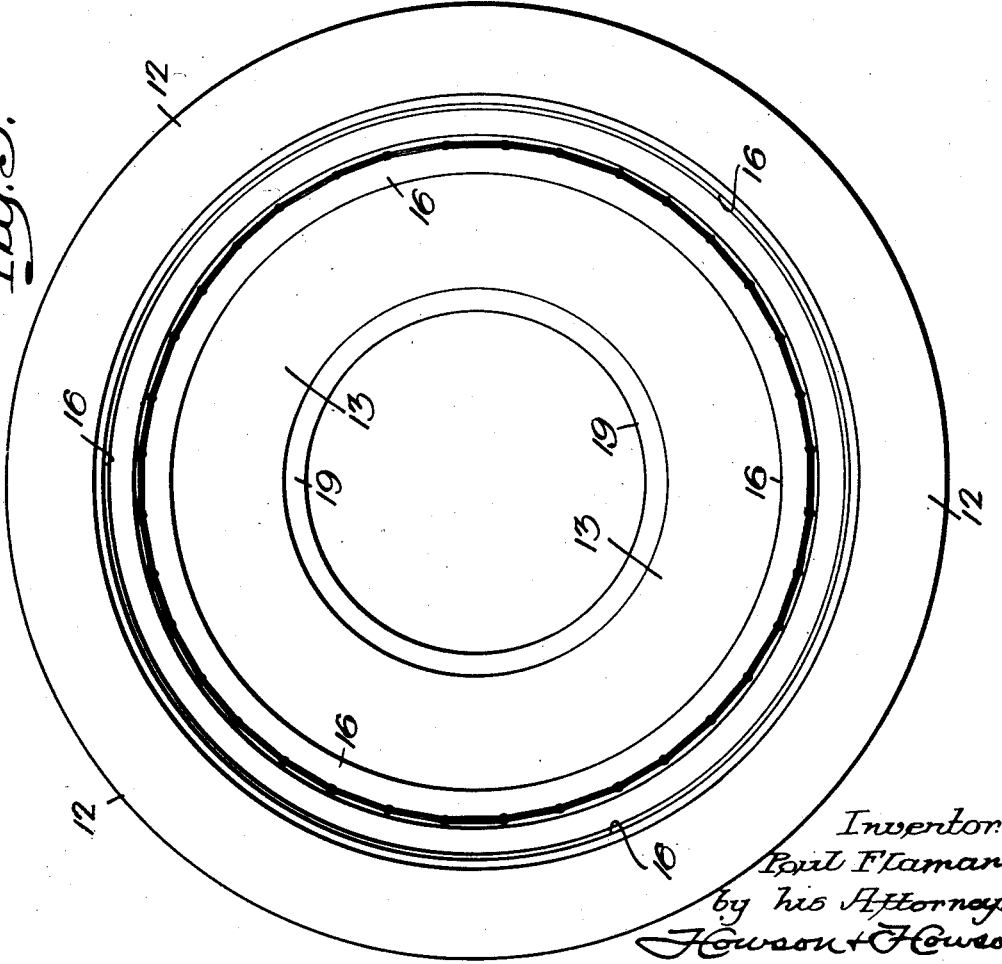
Inventor-
Paul Flamand
by his Attorneys
Howson + Howson

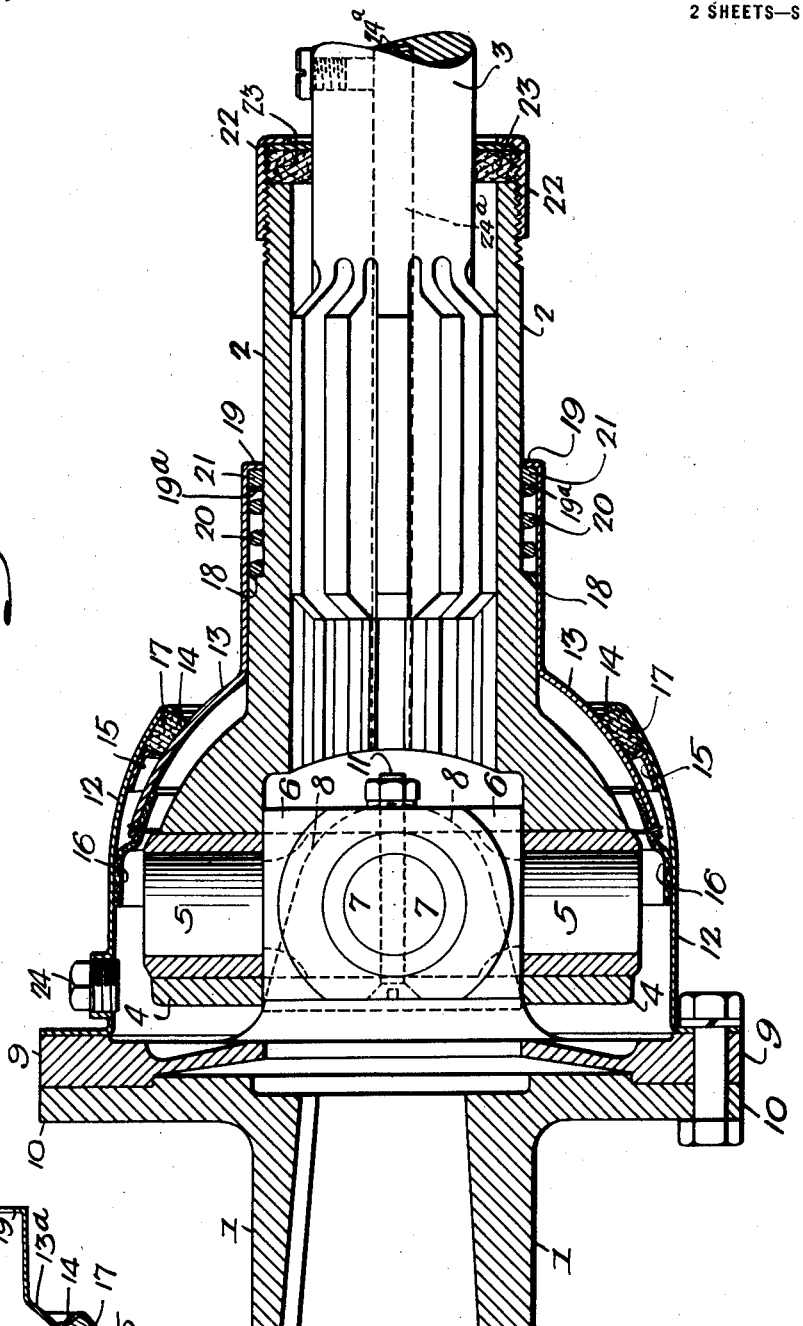

UNITED STATES PATENT OFFICE.

POUL FLAMAND, OF PHILADELPHIA, PENNSYLVANIA, ASSIGNOR TO POWELL EVANS, OF PHILADELPHIA, PENNSYLVANIA.

HOUSING FOR UNIVERSAL JOINTS.

1,361,573.      Specification of Letters Patent.      Patented Dec. 7, 1920.

Application filed October 23, 1919. Serial No. 332,676.

*To all whom it may concern:*

Be it known that I, POUL FLAMAND, a citizen of the United States, residing in Philadelphia, Pennsylvania, have invented Housings for Universal Joints, of which the following is a specification.

One object of my invention is to provide a relatively simple, inexpensive and reliable device for retaining lubricant within the housing or casing of a universal joint or other rotary jointed structure;—the arrangement of parts being such as to effectually prevent leakage of the lubricant between the relatively movable parts of said casing both when this is idle as well as when it is in rotation.

A further object is to provide a novel form of packing, particularly adapted for application to the relatively movable parts of a universal joint- or other casing, which shall prevent leakage of lubricant from the same without offering objectionable frictional resistance to the relative movement of the parts with which it is associated.

These objects and other advantageous ends I attain as hereinafter set forth, reference being had to the accompanying drawings, in which;

Figure 1 is a longitudinal section of a well known form of universal joint showing my invention as applied thereto;

Figs. 2 and 3 are respectively a longitudinal section and a front elevation of a slightly modified form of casing; and Fig. 4 is a fragmentary longitudinal section showing my invention as utilizing a spring pressure ring to assist in holding the packing ring in place.

In the above drawings 1 represents an outwardly flanged collar designed to be mounted on one end of one of two shafts to be connected and 2 represents a second collar or elongated sleeve internally splined for the reception of the second shaft 3 which is longitudinally fluted or provided with integral keys designed to fit into said sleeve 2.

Projecting from that end of the sleeve 2 adjacent the flanged collar 1 are two oppositely placed arms 4 having bearings for the reception of the trunnions or pivot pin 5 of the intermediate member 6 of the universal joint. A second pivot pin 7 extends at right angles to the pin 5 through the center thereof, through the middle of the body of said intermediate member and has its extremities journaled in a pair of lugs 8 projecting from a plate 9 bolted or otherwise suitably attached to the flange 10 of the collar or sleeve 1. The pin 7 is non-rotatably held to the body of the intermediate member 6 and to the pivot pin 5 by a bolt 11 which extends transversely through them.

For retaining lubricant around and in the vicinity of the above described universal joint, I provide an inclosing casing made in two parts 12 and 13, respectively fixed to the plate 9 and to the sleeve 2 and so proportioned that the part 13 extends into or telescopes with the part 12. The latter at one end is outwardly flanged, being held to the outer face of the plate 9 by the bolts employed to connect this to the flange 10, and while the casing is substantially cylindrical in form immediately adjacent said flange, its outer or second end portion has a substantially spherical curvature and its edge finally terminates in an inwardly extending flange 14 (Fig. 1) or in an outwardly extending angular rib (Fig. 2). While the casing part 13 which rests on or engages the body of the sleeve 2 is substantially cylindrical so as to more or less snugly fit the same, its end next to the main part of the universal joint is outwardly projected and has a substantially spherical curvature, so that it more or less loosely fits within the curved portion of the casing section 12.

This latter has welded or otherwise suitably fixed to its inner surface adjacent its inwardly flanged end a ring 15 of angular section including an inwardly extending flange spaced away from and substantially parallel with the flange 14, which with it defines an annular space for the reception of a body of suitable packing such as felt or equivalent material designed to prevent the entrance of dust, grit, etc., between the overlapping parts of the casing sections. In Fig. 2 this angular ring 15ª coacts with the terminal rib of the casing section 12 to form a channel extending around and opening upon the section 13 for the reception of the packing ring 17ª. Both of these rings 15 and 15ª are preferably spot-welded to the casing section 12.

The spherically curved portion of the casing section 13 adjacent its inner edge or end is provided in the present case with a series of perforations for the reception of a line of stitches whereby there is fixed to the inside of its edge a second packing ring 16 of flexible more or less stiff sheet material. One edge of this extends within the curved portion of the section 13 to which it is so held by the stitching as to make a liquid tight joint therewith and its other edge is extended outwardly so that its outer surface engages and closely fits the inner surface of the second casing section 12.

While I have found leather to satisfactorily serve as the material of which this packing ring is made, it is to be understood that without departing from my invention other flexible, close fitting sheet material may be used, so that it possesses sufficient stiffness to remain in engagement with the surface of the outer casing section and under conditions of use serves to prevent leakage of lubricant from the casing. Obviously if a small amount of such lubricant should pass this first packing ring, the second packing ring 17 effectually prevents its escape as well as keeps foreign material from entering the space between the casing sections. While I preferably hold the packing ring 16 to the casing section 13 by stitches, other suitable holding means may be used without departing from my invention.

In order to insure the close contact of the curved surface of the casing section 13 with the packing ring 17, I so mount said section that it is longitudinally movable on the body of the sleeve 2. This latter has a shoulder 18 between which and the inwardly flanged end 19 of said casing section 13 is mounted a coil spring 20 at all times acting to maintain the curved part of the section against said packing 17. It is to be understood that while the cylindrical portion of the section 13 may be made to so closely fit the body of the sleeve 2 as to prevent leakage of lubricant between them, I usually place a ring of packing 21 between the flange 19 and a washer 19$^a$ acted on by the spring 20, to insure the desired end.

In order to prevent the escape of lubricant between the shaft 3 and the sleeve 2, I thread upon the latter an inwardly flanged ring 22 and confine a body of packing 23 between the flange of said ring and the adjacent end of the sleeve. Under conditions of operation, heavy oil or other suitable lubricant is placed in the casing 12—13 through a filling opening normally closed by a plug or cap 24 (Fig. 1) or through a plug closed passage 24$^a$ in the shaft 3, and the escape of this is prevented by the various packing rings 16—17—21 and 23, the relatively flexible leather ring 16 being particularly adapted to perform its function regardless of the relative movement of the parts 12 and 13 of the casing such as occurs when the shafts engaging the sleeves 1 and 2 are not in line, since it is not only held by centrifugal force in close contact with the inner surface of the section 12 but is additionally pressed against the latter by the heavy oil in the casing itself.

Moreover since air is completely expelled from between the outer casing section and the flexible ring, these parts are held in the closest contact such as will be maintained and prevent leakage of lubricant when the parts are at rest. If desired I may assist or further insure the liquid retaining action of the ring 16 by mounting within it an outwardly acting spring ring 25 (Fig. 4) of suitable material such as spring sheet metal. In this case the casing section 13$^a$ is formed with an inwardly extending annular rib 26 adjacent its inner end and the flat leather fits over this rib where it is held so as to prevent leakage of liquid, by the flexible spring ring which is formed with a complementary groove for the reception of the annular part of the leather displaced by the rib 26. Said spring ring has edge notches or slots for increasing its flexibility and it is formed to closely fit against the inside surface of the leather ring so as to insure its being forcibly pressed at all times toward the outer casing section. If desired this latter section may have its major portion spherically curved so that no change of form of the leather packing ring occurs when the casing is rotated.

I claim:

1. The combination of a casing consisting of two parts of which one overlaps the other; with a flexible packing ring of relatively thin sheet material fixed to one of said parts and extending beyond the same into intimate movable engagement with the inside surface of the other part in position to be forced against the latter by the action of centrifugal force when the joint is in operation.

2. The combination of a casing consisting of two movably engaged parts of which one overlaps the other, the two parts being in spaced relationship with a packing ring of flexible sheet material fixed to one of the casing parts and projecting beyond the end thereof into intimate movable engagement with the other part to form a liquid tight joint therewith under operating conditions.

3. The combination of a casing consisting of two parts having spherically curved telescoping portions; a ring of flexible sheet material having one edge fixed to the inner surface of the inner of said parts and projecting beyond the end of the same parallel and in intimate contact with an extended portion of the inner surface of the other part.

4. The combination of a casing consisting of two relatively movable parts of which one extends within the other; a packing ring of sheet material attached to the end of the inner portion of the casing and projecting beyond the same into intimate engagement with the inner surface of the second casing portion; with a spring operative on said packing ring to maintain it in engagement with the outer casing portion.

5. The combination of a casing consisting of two relatively movable spherically curved sections of which one extends within the other; a packing ring of sheet material attached to the end of the inner section of the casing and projecting beyond the same into intimate engagement with the inner surface of the second casing section; a second packing ring carried by the outer casing and engaging the outer surface of the inner casing section; with a spring operative on the inner casing section to maintain the second packing ring in engagement with the inner casing section.

6. The combination in a universal joint; a shaft movably engaging one of the parts of said joint; a casing inclosing the joint and including two telescoping sections respectively mounted upon the parts of said joint; means for preventing leakage of liquid between one of the casing sections and one of the parts of the joint; a packing for preventing leakage between said part of the joint and the shaft; and a body of flexible sheet material fixed within one of the casing sections and extending beyond the same into intimate engagement with the inside surface of the other casing section in position to be forced into liquid tight engagement with the same by the action of centrifugal force.

7. The combination of a casing made in two telescoping sections of which the inner is formed with an annular rib; a ring of flexible sheet material fitting over said rib and projecting into intimate engagement with the adjacent surface of the other casing section; with a spring ring formed to coact with the casing rib to clamp the flexible ring in place and press its projecting portion toward the second casing section.

In witness whereof I affix my signature.

POUL FLAMAND.